United States Patent [19]
Peterson

[11] 3,756,612
[45] Sept. 4, 1973

[54] ADJUSTABLE TENSION FEED CHUCK FOR MACHINE TOOLS

[75] Inventor: Anders Adolf Peterson, Elmira, N.Y.

[73] Assignee: Hardinge Brothers, Inc., Elmira, N.Y.

[22] Filed: Jan. 4, 1971

[21] Appl. No.: 103,770

Related U.S. Application Data

[63] Continuation-in-part of Ser. No. 877,997, Nov. 19, 1969, abandoned.

[52] U.S. Cl.............................. 279/41 A, 279/46 A
[51] Int. Cl............................................. B23b 31/20
[58] Field of Search........................... 279/23, 41, 46

[56] References Cited
UNITED STATES PATENTS 3,135,521  6/1964  Eve........................................ 279/46
1,855,515  4/1932  Dingell................................... 279/46

OTHER PUBLICATIONS

Publication: Product Engineering, Dated February, 1941, page 59, illustration & article dealing with special chuck developed by Independent Pneumatic Tool Company

*Primary Examiner*—Francis S. Husar
*Attorney*—Shlesinger, Arkwright & Garvey

[57] ABSTRACT

An adjustable tension feed chuck for machine tools including a tubular body member, spring tensioned furcations associated with said body member for gripping bar stock for feeding purposes and means for adjusting the tension of said spring tension furcations.

22 Claims, 23 Drawing Figures

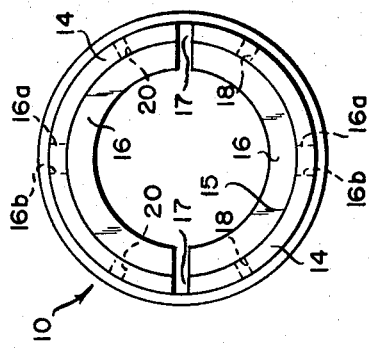
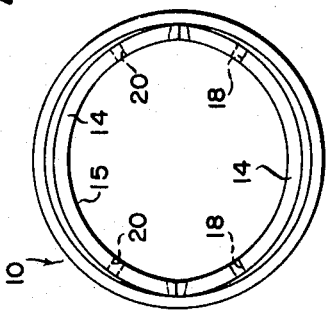
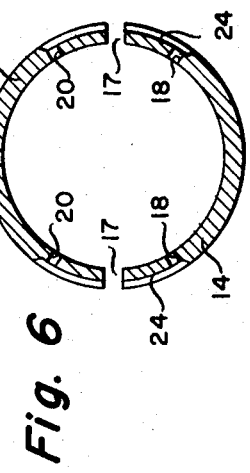
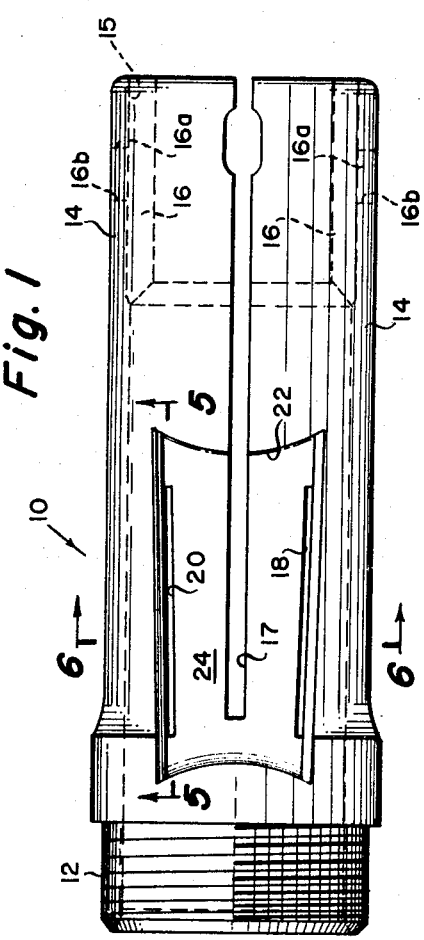
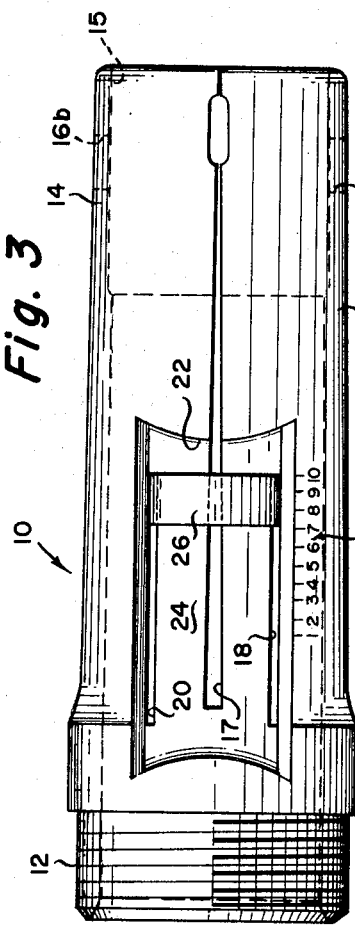
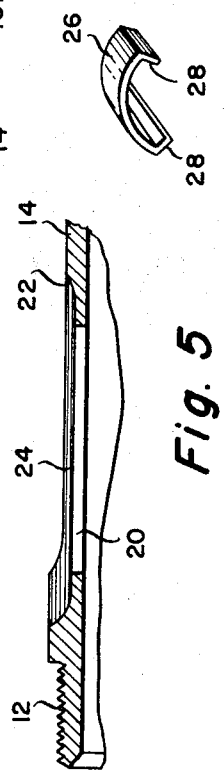
INVENTOR.
Anders Adolf Peterson

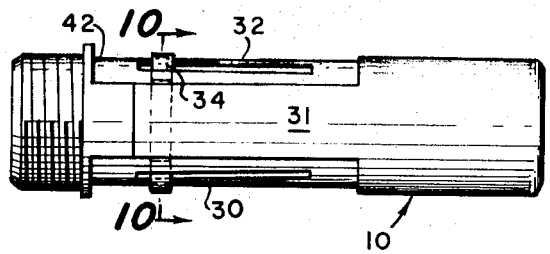
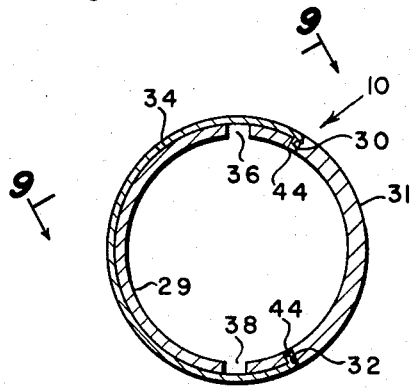
Fig. 8
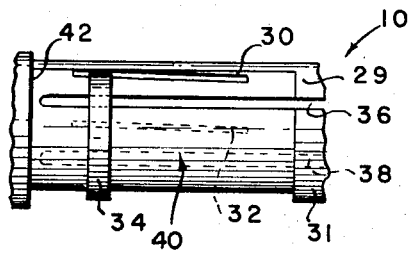
Fig. 9
Fig. 10
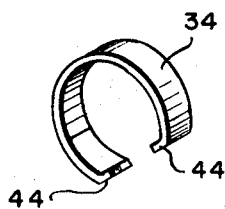
Fig. 11
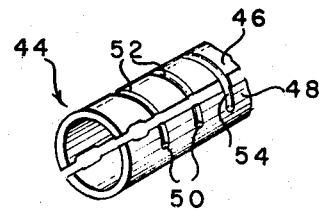
Fig. 12
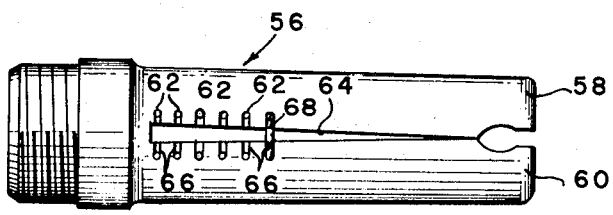
Fig. 13

ADJUSTABLE TENSION FEED CHUCK FOR MACHINE TOOLS

This application is a continuation-in-part of my co-pending application Ser. No. 877,997, filed Nov. 19, 1969, and now abandoned for "Adjustable Tension Feed Chuck for Machine Tools."

This invention relates to an adjustable tension feed chuck for use in feeding bar stock on machine tools.

This type chuck consists of a bifurcated tubular body, the furcations of which are heat treated to provide a spring tension therein. It is this spring tension which serves to secure the work piece in the ends of the furcations.

Some of these types of feed chucks include pads which are inserted into the end of the chuck and have various internal cross-sections for holding stock of different cross-sectional configurations.

It is readily seen that when any wear occurs in either the pads or the furcations of this type of chuck, the chuck will rapidly lose its effective holding force on the bar stock which may then slip within the chuck. The obvious result of this is that the bar stock may not be properly fed.

In order to overcome the difficulties of this type of chuck wherein the tension of the furcations is fixed, this invention provides a means whereby the tension of the furcations may be varied to increase the holding force on the bar stock and in this manner compensate for wear in the gripping surface of the chuck.

Therefore, a primary embodiment of this invention is to provide a feed chuck wherein the work gripping force may be adjusted to compensate for wear.

A further object of this invention is to provide an adjustable tension feed chuck which overcomes the difficulties of the prior art types of feed chucks mentioned above.

Yet another object of this invention is to provide an adjustable tension feed chuck which is simple in construction and yet provides a means for maintaining the accuracy of the chuck.

Yet another object of this invention is to provide an adjustable tension feed chuck wherein the tension of the gripping jaws may be easily adjusted.

Still another object of this invention is to provide an adjustable tension feed chuck wherein a clip is applied to the furcations and positioned along the fingers of the chuck for varying the tension of the fingers.

Another object of this invention is to provide an adjustable tension feed chuck which includes positive means for retaining the pre-set tension in the work gripping fingers.

Yet a further object of this invention is to provide an adjustable tension feed chuck which includes a clip secured to one of said spring fingers and passing around the remainder of the fingers.

Another object of this invention is to provide a slidable means for varying the tension of the feed chuck and including vernier indicia on the chuck to facilitate changing of the tension to a pre-set value.

These and other objects and advantages of this invention will become apparent when considered together with the following specification and claims when considered in conjunction with the drawings in which:

FIG. 1 is a top plan view of the feed chuck of this invention;

FIG. 2 is an end view of FIG. 1;

FIG. 3 is a plan view of the feed chuck of FIG. 1 but with the clip in place.

FIG. 4 is an end view of FIG. 3;

FIG. 5 is a view along lines 5—5 of FIG. 1 and viewed in the direction of the arrows;

FIG. 6 is a view along lines 6—6 of FIG. 1 and viewed in the direction of the arrows;

FIG. 7 is a perspective view of the clip used with the chuck of FIG. 1;

FIG. 8 is a side view of an alternate embodiment;

FIG. 9 is a plan view along lines 9—9 of FIG. 10 and viewed in the direction of the arrows;

FIG. 10 is a section along lines 10—10 of FIG. 8 and viewed in the direction of the arrows;

FIG. 11 is a perspective view of the clip used with the embodiment of FIG. 8;

FIG. 12 is a fragmentary perspective view of an alternate embodiment of this invention;

FIG. 13 is a side view of another alternate embodiment of this invention;

DESCRIPTION OF THE PRIMARY EMBODIMENT

Figure 15:
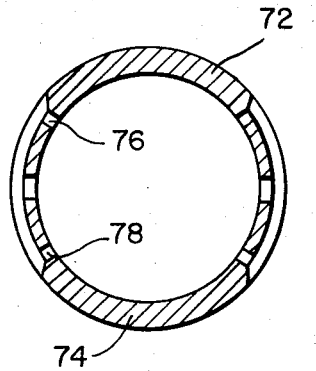
FIG. 15 is a section along lines 15—15 of FIG. 14 and viewed in the direction of the arrows.
Figure 16:
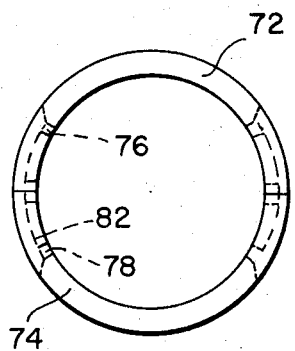
FIG. 16 is an end view of FIG. 14.

The primary embodiment of this invention is shown in FIG. 1 wherein 10 generally designates the chuck of this invention. Chuck 10 contains a threaded tubular body portion 12 and furcations 14 extending therefrom. Within the distal end of furcations 14 is a generally tubular recess 15 which serves as the work gripping portion of the chuck 10. The chuck shown in FIG. 3 is of the type which is used with pads 16 having lugs 16a shown in FIG. 1 which are inserted within the recess 15 and lug holes 16b for gripping the bar stock.

The body portion 12 of the chuck 10 may be threaded either internally or externally for threaded emgagement with a machine tool spindle.

THe bar stock (not shown) is held by the pads inserted within the furcations 14 of the chuck 10 by means of the spring tension of furcations 14.

In order to overcome the disadvantages of prior art chucks, the chuck of this invention has been adapted to provide a means for varying the work gripping tension of the furcations 14. This is accomplished by means of the recesses 18 and 20 which are milled or otherwise formed into furcation 14. For this application, the term "recess" is intended to include groove, slot, hole, depression, etc. One of these recesses is milled on each side of each furcation in the primary embodiment, adjacent each of the gaps or slots between each of the furcations 14. The furcations 14 are closed as shown in FIG. 3, and heat treated to maintain this position after which recesses 18 and 20 are milled parallel to each other while the furcations 14 are in this position. After the milling of recesses 18 and 20 if the furcations were forced outward to resume the position of the chuck 10 in FIG. 1, the recesses 18 and 20 are then divergent toward the end of the furcations 14.

The area around recesses 18 and 20 is also milled as at 22 to provide a recesses area 24. To prepare the chuck for use, a clip 26 as shown in FIG. 7 is provided having inwardly turned portions 28. The clips 26 are placed in recesses 24 with the inwardly turned portions 28 engaging recesses 18 and 20. Thus, clips 26 may be slid along recesses 18 and 20 and furcations 14, and in this manner increase or decrease the pressure on furcations 14 when bar stock is therein inserted by in effect lengthening or shortening slots 17. The clip 26 may be placed anywhere along slots 18 and 20, to compensate for the wear in recess 15 if pads are not used. Also, the adjustability will compensate for wear in the pads (not shown) which are used in conjunction with the chuck as shown in FIG. 3.

Indicia 19 is provided along furcations 14 adjacent recesses 18 or 20 to facilitate relocation of clip 26 to the same position for each use.

DESCRIPTION OF FIGURES 8–11

FIGS. 8 and 9 are fragmentary plan views of an additional embodiment of this invention. In this embodiment, the chuck 10 includes two furcations 29 and 31 which are separated by slots 36 and 38. In furcation 31 are formed two recesses 30 and 32. A recessed area 40 is formed in furcations 29 and 31 as by milling at 42.

A clip member 34 of the type shown in FIG. 11 is provided with inwardly turned portions 44. These portions 44 engage recesses 30 and 32 when the clip 34 is in place on the chuck 10. Since in this embodiment recesses 30 and 32 are both formed in furcation 31, clip member 34 passes completely around furcation 29, and as clip 34 is slid along the recess 30 and 32, the furcations 29 and 31 are urged together to increase the tension in the same manner as in FIG. 3. Recesses 30 and 32 converge in a direction toward the end of furcations 29 and 31.

DESCRIPTION OF FIG. 12

FIG. 12 shows another embodiment of a means for adjusting the tension of a chuck of this type. In this embodiment, the chuck generally designated 44 includes furcations 46 and 48. Furcation 48 is provided with a series of linearly aligned, longitudinally spaced holes 50 on each side of the furcation 48.

Extending from holes 50 and passing around furcation 46 to the other side of furcation 48 and to corresponding opposite holes 50 are recesses 52. These recesses 52 are adapted to receive a clip 54 substantially flush with the surface of 46 and 48. In this manner, a clip 54 may be inserted into any pair of cooperating holes 50 along the length of furcation 48 for securing the furcations 46 and 48 under the desired tension. By properly choosing the pairs of holes 50 the pressure on the work gripping portions of furcations 46 and 48 is varied and the bar stock can be held at the desired tension within the chuck 44. The series of holes 50 are convergent in a direction toward the end of furcation 48 in a manner similar to the recesses 32 in FIG. 8.

DESCRIPTION OF FIG. 13

In FIG. 13, a chuck 56 is shown having furcations 58 and 60. Each of the furcations 58 and 60 has along each edge thereof a plurality of linearly aligned, longitudinally spaced holes 62. Extending from holes 62 toward the space 64 between furcations 58 and 60 are recesses 66 which will enable clip 68 to remain flush with the surface furcations 58 and 60.

By positioning clip 68 in any pair of holes 62, the furcations 58 and 60 may be adjusted to maintain a positive gripping force on a work piece.

Indicia may be provided on each of the alternate embodiment in a manner similar to indicia 19 of FIG. 3, in order to facilitate relocation of the clip along the furcations.

DESCRIPTION OF FIGS. 14–18

Figure 14:
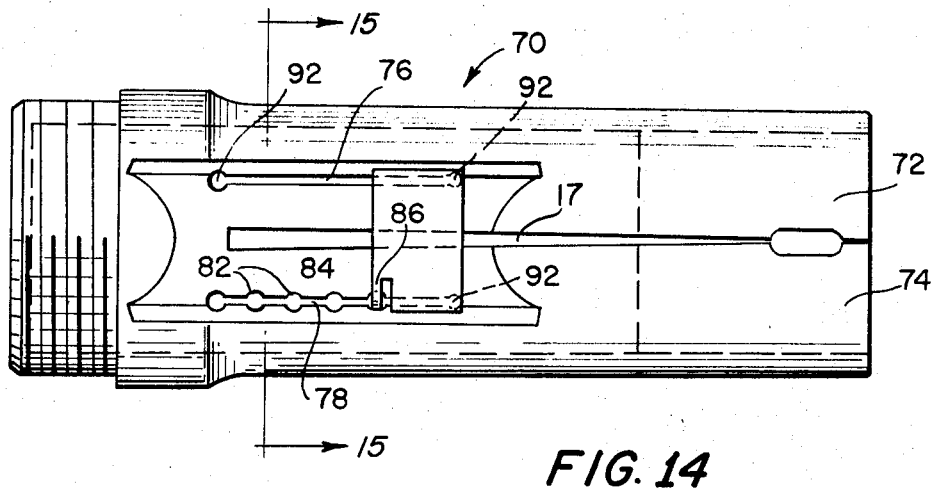
FIG. 14 is a side view of an alternate embodiment of this invention.

FIG. 14 illustrates an alternate embodiment of this invention and is somewhat similar to the embodiment of FIG. 3. In FIG. 14, a feed chuck generally designated 70 includes furcations 72 and 74 and a pair of longitudinally extending recesses 76 and 78 similar to recesses 18 and 20 of FIG. 3. Clip 80 is positioned in recesses 76 and 78, and is slideable along recesses 76 and 78, in the manner previously described for adjusting the tension of the feed chuck 70.

Figure 17:
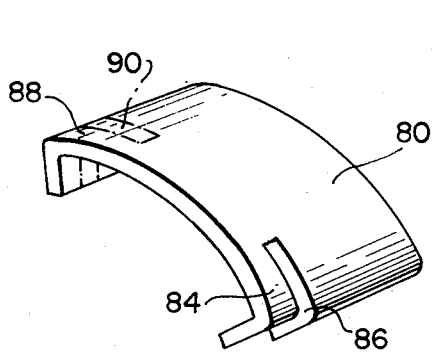
FIG. 17 is a perspective view of the clip used in the embodiment of FIG. 14.
Figure 18:
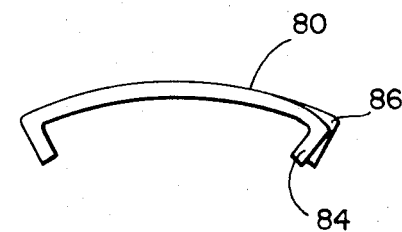
FIG. 18 is an end view of the clip of FIG. 17.

Recess 78 has formed therein a plurality of circular notches 82, and clip 80 has a deformed portion 84 formed by a cut 86 in the clip 80. After the cut is made, the deformed portion 84 is bent slightly as best seen in FIG. 17, enabling portion 84 to engage any one of notches 82 along the recess 78. In this manner, by the interengagement of portion 84 with recesses 82, the clip 80 is locked in position on the feed chuck, and normal operation of the feed chuck will not cause shifting of clip 80 and thus variation of the tension of the feed chuck 70. However, in order to vary the tension by moving the clip 80, all that need be done is to tap the clip in the direction desired which will deflect slightly the deformed portion 84 as it passes over the notches 82, and the clip 80 may then be placed in the desired position with the deformed portion 84 in anyone of the notches.

FIG. 17 discloses an alternate embodiment wherein a deformed portion 88 may be provided at the opposite side of clip 80 by means of a cut 90. This would enable the use of notches in either of recesses 76 and 78, or the clip 80 could be turned end for end for use with the chuck 70.

It should be noted that a circular cut 92 is made at the end of each of the recesses 76 and 78, and this permits flexing of the furcations 72 and 74 with greater longevity of the feed chuck by relieving the stress at these points. Furthermore, the use of the clip in the manner described shortens the effective length of the slot 17 between the furcations 14, or 72 and 74 so that centrifugal force of the rotating chuck does not act to open the furcations at high speed. Additionally, the provision of the recesses 18 and 20, or 76 and 78 have, surprisingly, been found to increase the fatigue life of the feed chuck even if the clip is not used. Apparently, this benefit is achieved because of a more even distribution of stress over the entire area of the chuck body.

DESCRIPTION OF FIGS. 19–21

Figure 19:
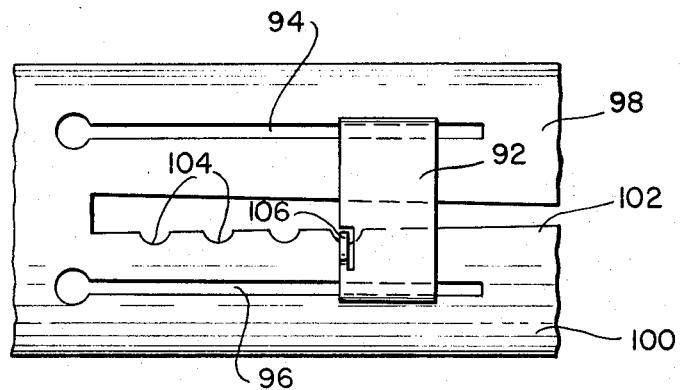
FIG. 19 is a fragmentary side elevational view of an alternate embodiment of this invention.
Figure 20:
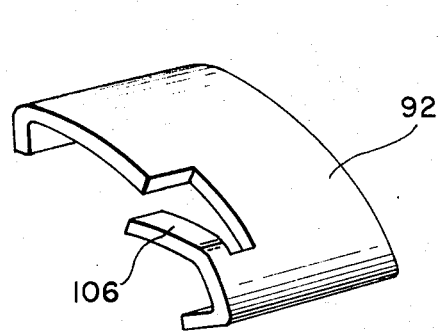
FIG. 20 is a perspective view of the clip of FIG. 19.
Figure 21:
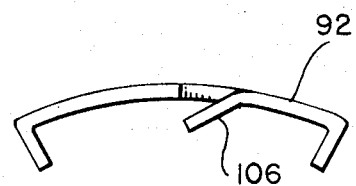
FIG. 21 is an end view of the clip of FIG. 20.

With reference now to FIG. 19, an alternate embodiment of the clip locking feature is shown. A clip 92 is shown in position in recesses 94 and 96 in furcations 98 and 100. Furcations 98 and 100 are separated by slot 102.

Formed in one side of the slot 102 are a plurality of notches 104. A portion of clip 92 is bent downwardly to form a tang 106, and as clip 92 is slid along recesses 94 and 96, tang 106 can engage any of notches 104 to lock clip 92 in the desired position.

DESCRIPTION OF FIGS. 22–23

Figure 22:
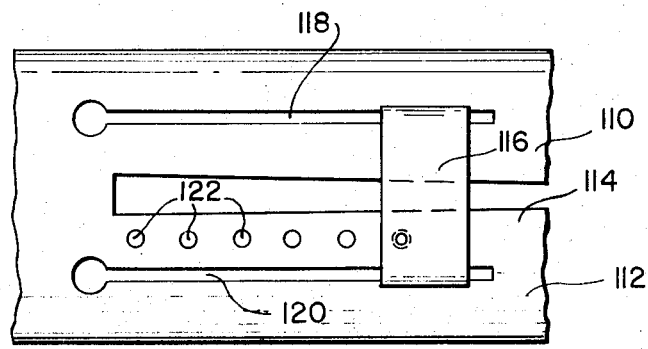
FIG. 22 is a fragmentary side elevational view of another alternate embodiment of this invention.
Figure 23:
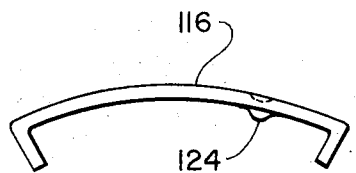
FIG. 23 is an end view of the clip of FIG. 22.

FIG. 22 shows still another embodiment of the locking feature of this invention, and illustrates furcations 110 and 112 separated by a slot 114. The clip 116 is slideable in recesses 118 and 120 in a manner previously described and positioned between slot 114 and recess 120 is a plurality of depressions 122. Depressions 122 are generally spherical, and have a shape complementary to that of the projection 124 on the underside of clip 116 as seen in FIG. 23. Thus as clip 116 is slid along recesses 118 and 120, projection 124 may engage any of recesses 122 to secure clip 116 in the desired position. Obviously, the depressions 122 could be formed on the opposite side of slot 114, and between slot 114 and recess 118.

While this invention has been described, it will be understood that it is capable of further modification, and this application is intended to cover any variations, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What I claim is:

1. An adjustable tension feed chuck for machine tools comprising:
    a. a tubular body member,
    b. at least two spring tensioned furcations extending from said tubular body member for gripping a workpiece,
    c. clip means for adjusting the tension of said furcations,
    d. at least two longitudinal slots in said furcations, said slots being divergent toward the distal end of said furcations,
    e. said clip means being positioned in and movable along said slots for urging said furcations radially inward,
    f. whereby the longitudinal position of said clip means determines the tension of said spring tensioned furcations.

2. An adjustable tension feed chuck for machine tools as in claim 1 and wherein:
    a. said furcations are recessed radially to receive said clip means substantially flush with the outer surface of said furcations.

3. An adjustable tension feed chuck as in claim 1 and including:
    a. a plurality of notches formed in said furcations adjacent each of said slots,
    b. whereby each of said deformed portions engages one of said notches for securing said clip in position.

4. An adjustable tension feed chuck as in claim 1 and including:
    a. slot means for separating said furcations,
    b. notches formed in said slot means,
    c. whereby when said clip is positioned along said recess, said deformed portion engages one of said notches for securing said clip in position.

5. An adjustable tension feed chuck for machine tools as in claim 1 and wherein:
    a. one of said slots is formed in one of said furcations, and
    b. another of said slots is formed in another of said furcations.

6. An adjustable tension feed chuck for machine tools as in claim 5 and including:
    a. vernier indicia on said furcations adjacent said clip means.
    b. said clip means comprising two clip members, each selectively engaging one of said openings in each of two of said series of openings on adjacent sides of two of said furcations.

7. An adjustable tension feed chuck for machine tools as in claim 1 and wherein:
    a. said slots are formed in the same furcation.

8. An adjustable tension feed chuck for machine tools as in claim 7 and wherein:
    a. said clip means encompasses more than one half of the radial distance around all of said furcations.

9. An adjustable tension feed chuck for machine tools as in claim 7 and wherein:
    a. said slots are convergent on said furcation in a direction toward the end of said furcation.

10. An adjustable tension feed chuck for machine tools as in claim 1 and wherein:
    a. one of said slots is positioned adjacent each side of each of said furcations.

11. An adjustable tension feed chuck for machine tools as in claim 10 and wherein:
    a. said clip means encompasses less than one half of the radial distance around all of said furcations.

12. An adjustable tension feed chuck for machine tools comprising:
    a. a tubular body member,
    b. at least two spring tensioned furcations extending from said tubular body member for gripping a work-piece,
    c. at least two series of linearly aligned, longitudinally spaced, radial openings in said furcation,
    d. clip means selectively engageable with one of said openings in each of said series,
    e. whereby the position of said clip means determines the tension of said spring tensioned furcations.

13. An adjustable tension feed chuck as in claim 12 and wherein:
    a. each of said series of openings is formed in the same furcation.

14. An adjustable tension feed chuck for machine tools as in claim 13 and wherein:
    a. said clip means encompasses more than one half of the radial distance around all of said furcations.

15. An adjustable tension feed chuck for machine tools as in claim 14 and wherein:
    a. said furcations are recessed radially to receive said clip means substantially flush with the outer surface of said furcations.

16. An adjustable tension feed chuck as in claim 12 and wherein:
    a. one of said series of openings is formed adjacent the edge of one of said furcations,
    b. another of said series of openings is formed in an adjacent edge of another of said openings.

17. An adjustable tension feed chuck for machine tools as in claim 16 and wherein:
   a. said clip means encompasses less than one half of the radial distance around all of said furcations.
18. An adjustable tension feed chuck as in claim 12 and wherein:
   a. one of said series of openings is formed adjacent each edge of two of said furcations.
19. An adjustable tension feed chuck for machine tools as in claim 18 and wherein:
   a. said clip means encompasses less than one half of the radial distance around all of said furcations.
20. An adjustable tension feed chuck for machine tools as in claim 19 and wherein:
   a. said furcations are recessed radially to receive said clip means substantially flush with the outer surface of said furcations.
21. An adjustable tension feed chuck for machine tools as in claim 20 and wherein:
   a. each two adjacent series of holes are convergent in a direction toward the end of said furcations.
22. An adjustable tension feed chuck for machine tools as in claim 21 and including:
   a. vernier indicia on at least one of said furcations adjacent each two adjacent series of holes.

* * * * *